April 11, 1939.  D. E. PRIEST  2,154,009
MANUFACTURE OF HACKSAW FRAME MEMBERS
Original Filed Sept. 18, 1935
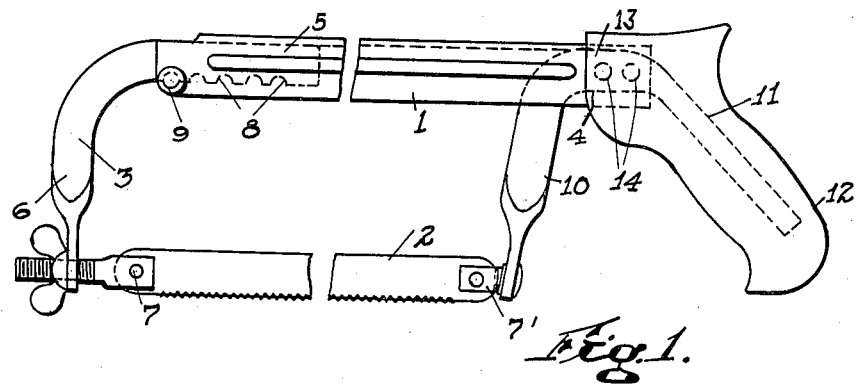
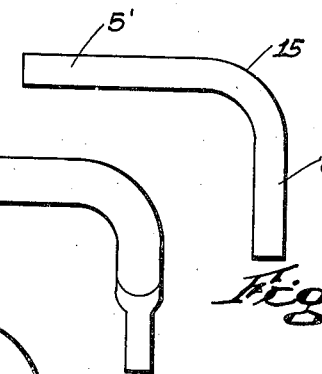
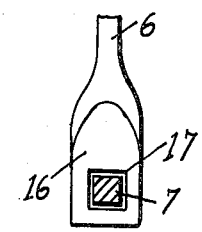
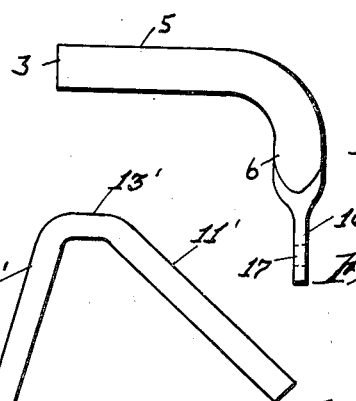
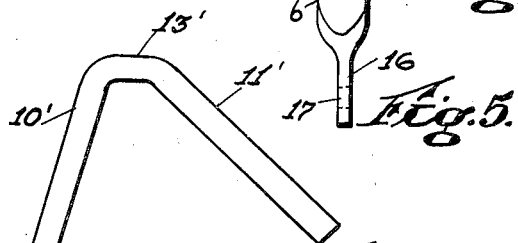
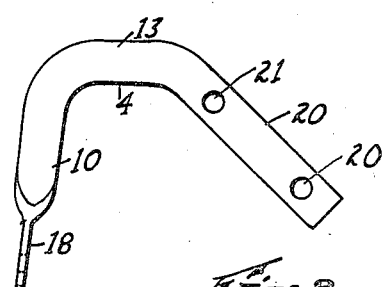
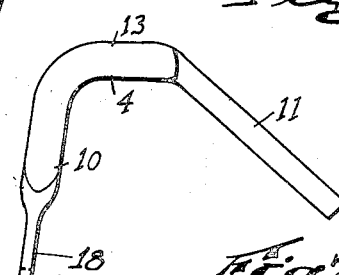
Inventor:
Dwight E. Priest
By Geo. H. Kennedy Jr.
Attorney Patented Apr. 11, 1939

2,154,009

UNITED STATES PATENT OFFICE 2,154,009

MANUFACTURE OF HACKSAW FRAME MEMBERS

Dwight E. Priest, Worcester, Mass., assignor to Parker Wire Goods Company, Worcester, Mass., a corporation of Massachusetts Original application September 18, 1935, Serial No. 41,113, now Patent No. 2,058,107, dated October 20, 1936. Divided and this application September 21, 1936, Serial No. 101,730

2 Claims. (Cl. 29—148)

This application is a division of my parent application Serial No. 41,113, filed September 18, 1935, Patent No. 2,058,107, the latter having matured as Reissue Patent No. 20,252, dated January 26, 1937, on an application filed Nov. 30, 1936, for Hacksaw frame construction; the present invention relates to the method of making certain hacksaw frame members of my aforesaid patented hacksaw frame construction.

The frame members in question are those which support the retaining and tensioning devices for the saw blade,—and an object of my invention is to improve and simplify the manufacture of such members, and thus to make possible the production of hacksaws and like devices which are stronger, more durable, and more satisfactory in operation than similar devices of this character now in ordinary use. Other and further objects and advantages of the invention will be apparent from the following detailed description of the same, taken in connection with the accompanying drawing, in which—

Fig. 1 is a view in side elevation illustrating the improved hacksaw which is shown, described and claimed in my aforesaid copending application.

Fig. 2 is a fragmentary end view of parts shown in Fig. 1, on a somewhat larger scale than Fig. 1.

Figs. 3, 4 and 5 are detail views illustrating successive steps in the manufacture of the adjustable end member of my improved hacksaw frame construction shown by Fig. 1.

Figs. 6 and 7 are detail views illustrating successive steps in the manufacture of the other end member of said frame.

Fig. 8 is a view similar to Fig. 7, illustrating a modification of the invention.

Like reference characters refer to like parts in the different figures.

Referring first to Figs. 1 and 2, illustrating the improved saw assembly of my aforesaid copending application, the saw frame is constituted by an intermediate elongated member 1, substantially parallel to the saw blade 2 and of downwardly opening channel section, and by two end members 3 and 4. The outer end member 3 (here shown as the adjustable member of the frame) is of bent or curved form to provide a substantially horizontal portion 5 received in the channel of member 1, and a substantially vertical portion 6, adapted to carry at its lower end one of the devices 7 for securing and tensioning the saw blade 2 in the frame. Said horizontal portion 5 of member 3 is provided along its lower edge with a plurality of notches 8, 8, adapted to cooperate with a pin 9 extending across member 1; when the saw blade is being put in place, the member 3 can be moved in or out, as desired, to bring any selected notch 8 into engagement with pin 9, thereby to make the length of the frame appropriate to the length of the blade which is to be used therein. The other or inner end member 4 is of bent or curved form to provide a depending leg portion 10 adapted to carry at its lower end the other device 7' for securing and tensioning the saw blade, and also to provide a second depending leg 11 adapted to be embedded by the handle 12. Between said two depending leg portions 10 and 11, said member 4 has a substantially horizontal portion 13 received in the channel of member 1, and secured rigidly thereto by rivets, welding, or the like, as indicated at 14.

Heretofore, in the manufacture of hacksaw frames of the general type above set forth, it has been the practice to make the end members, (corresponding substantially to the members 3 and 4 above), from stock of relatively wide flat section in order to obtain the requisite stiffness for said members in the plane of the frame without unduly increasing the latter's weight; such stock, after being cut to the length required for such an end member, has to be bent to provide the depending legs 6 or 10, as the case may be,— an operation that is attended with considerable difficulty, as well as with risk of spoiling or deforming the stock, because the outer edge of the bend is necessarily on a much greater radius than the inner edge of the bend. The bending of such flat stock across its width or greatest sectional dimension causes undue stretch of the material at the outer edge of the bend and undue compression of the material at the inner edge of the bend; this may well result in internal stresses and strains that seriously affect the strength of the frame member. It has also been proposed, with a frame member made from such wide flat stock, to impart to such stock, at the lower extremity of said member, a 90° twist, thereby to give sufficient width of stock at the extremity of the leg for an aperture adapted to receive the saw blade retaining device; such twisting of the flat stock, even though confined to the extremity of the leg, materially reduces the strength and stiffness of the frame member in the plane of the saw.

According to my invention, the end members 3 and 4 of the saw frame, instead of being made by the bending to appropriate form of stock that is already rolled or otherwise fabricated to the desired wide flat cross sectional form, are made from stock which is readily bendable, for example, wire rod stock of substantially round cross section; the procedure with a piece of such stock, cut to appropriate length, is first to provide the bend and then to subject the bent piece to the appropriate flattening operation or operations for so altering its section as to give the frame the requisite stiffness.

For example, referring to Figs. 3, 4 and 5, the production, according to my invention, of the end member 3 involves the use of a piece 15 of round rod stock of the required length, the first operation on which is to bend it so as to provide the respective horizontal and vertical portions 5' and 6'; thereupon, the bent piece is subjected to a pressing, rolling or hammering operation by which to flatten out the horizontal portion 5' and also most of the length of the leg 6', as shown in Fig. 4. Another pressing, rolling or hammering operation is availed of to flatten out, in a plane substantially at right angles to the flattened portions of Fig. 4, the lower extremity of leg 6', as shown at 16, Fig. 5,—this flattened portion 16 thus presenting a stock section which is ample in width, crosswise of the plane of the saw frame, to have formed therein a suitable socket or hole 17, Fig. 2, for directly receiving the tensioning device 7 for the saw blade.

Similarly, for the production of the end member 4, an appropriate length of wire rod stock is first bent (see Fig. 6) to provide the depending divergent portions 10' and 11' and the intermediate horizontal portion 13'; then, as shown in Fig. 7, by suitable pressing or hammering operations, the portion 13' and most of the length of portion 10' are flattened out to give the requisite stiffness to said member in the plane of the frame, and another flattening operation is performed on the extremity of leg 10', in a plane at right angles to the first-mentioned flattening, to provide a terminal portion 18 matching the portion 16 of member 3, and of sufficient width, crosswise of the saw frame, to have formed therein a socket or aperture 19 adapted to directly receive the blade retaining device 7'. As shown in Fig. 8, the first-mentioned flattening operation on the stock for member 4 may include the leg portion 11' which is adapted, as shown by Fig. 1, to be embedded in the handle 12 of the saw. Such flattening, as shown at 20, Fig. 8, permits the formation of holes 21, 21 to receive screws, rivets, or the like, by which the halves of a two-part or split handle, not shown, may be secured to each other and to the member 4.

I claim,

1. In the manufacture of a hacksaw frame member, having a handle portion and a depending leg portion, the latter at its extremity adapted to receive a saw-blade retaining device, the improvement which consists in initially forming two bends in a piece of substantially round rod stock to provide said handle portion and said leg portion in proper angular relation to the remainder of said piece, and thereafter flattening said handle portion and said leg portion, except at the latter's extremity, in a longitudinal plane and flattening the leg portion's extremity in a transverse plane, whereby to impart sufficient width to said leg extremity for the passage therethrough of a saw-blade retaining device.

2. In the manufacture of a hacksaw frame member, having a longitudinally extending portion and a depending leg portion, the latter at its extremity adapted to receive a saw-blade retaining device, the improvement which consists in initially forming a bend in a piece of substantially round rod stock to provide said two portions in proper angular relation to each other, and thereafter flattening said longitudinal portion and said leg portion, except at the latter's extremity, in a longitudinal plane, to increase the member's resistance to bending in the plane of the frame, and flattening the leg portion's extremity in a transverse plane, whereby to impart sufficient width to said leg extremity for the passage therethrough of a saw-blade retaining device.

DWIGHT E. PRIEST.